June 7, 1966 W. W. DEIGHTON ET AL 3,254,854

TAPE HANDLING APPARATUS

Filed Aug. 13, 1963 2 Sheets-Sheet 1

INVENTORS
WILLIAM W. DEIGHTON &
BY ANTHONY G. CAPRIO
Martin Lukacher
Attorney

INVENTORS
WILLIAM W. DEIGHTON &
ANTHONY G. CAPRIO
BY Martin LuKacher
Attorney

United States Patent Office 3,254,854
Patented June 7, 1966

3,254,854

TAPE HANDLING APPARATUS

William W. Deighton, Glen Mills, Pa., and Anthony G. Caprio, Cherry Hill, N.J., assignors to Radio Corporation of America, a corporation of Delaware Filed Aug. 13, 1963, Ser. No. 301,713
4 Claims. (Cl. 242—55.12)

Figure 1:
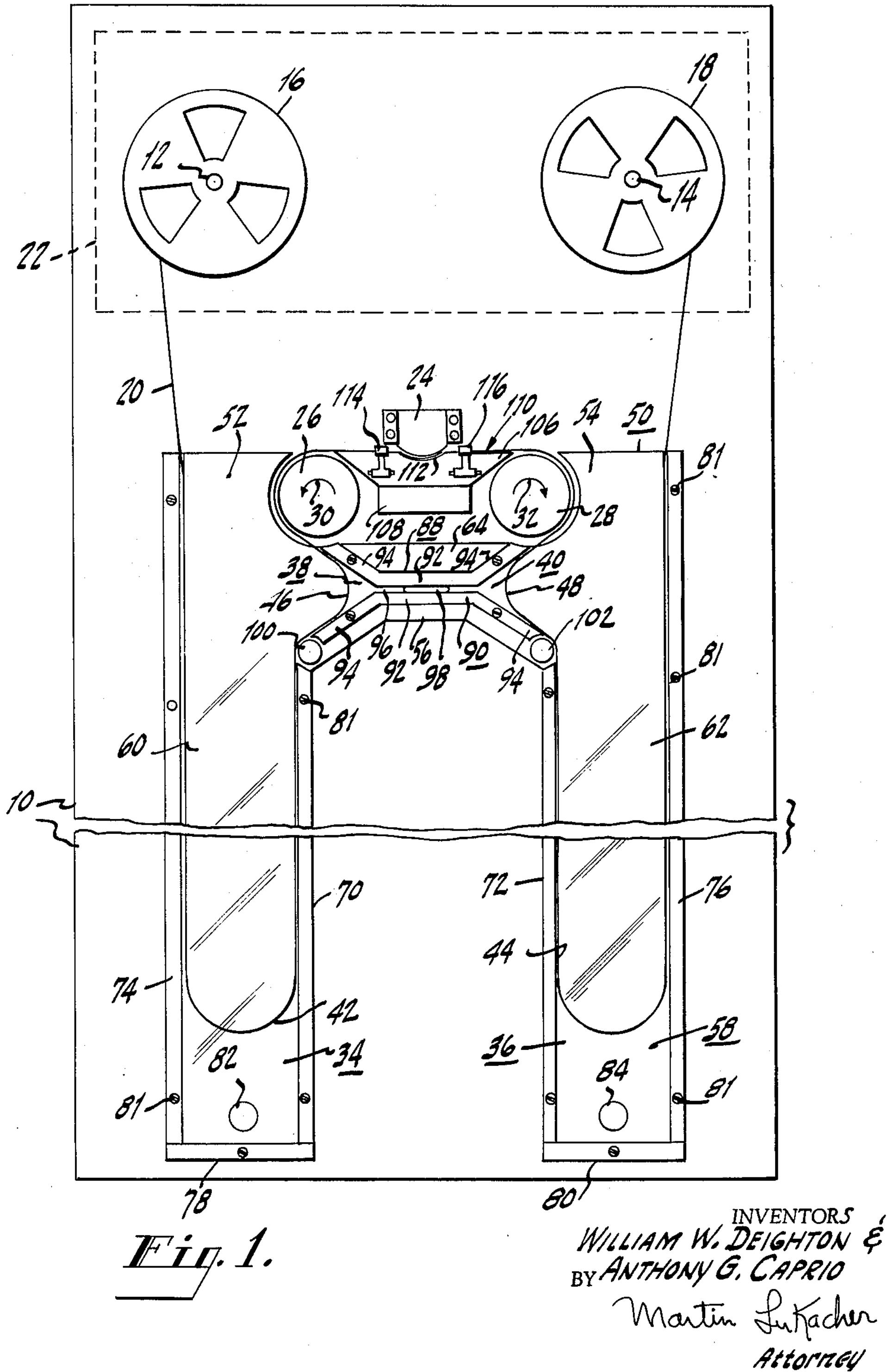

This invention relates to tape handling apparatus, and particularly to apparatus in which tape may be started from rest and rapidly accelerated.

The invention is especially suitable for use in tape transports for computer tape stations in which a magnetic tape record is started from rest, rapidly accelerated to very high speed, say, 150 to 200 inches per second, stopped, and again accelerated in the same or in a reverse direction. Aspects of the invention may also be applicable to the handling of films and webs generally. Accordingly, the term "tape," as used herein, may be taken to include films and other web mediums, where appropriate.

Tape handling apparatus of a tape station should have the capability of starting, stopping, and reversing the tape record, from which information is read and supplied to the computer and on which output information from the computer is written, in order to meet the needs of the computer for different items of input information which may be located on separated parts of the tape and in order to write the output information supplied by the computer at any desired location on the tape. The information handling speed of the tape station may be increased by reducing the time required for starting, stopping, and reversal of the tape. Loops of tape are often provided between the reels on which the tape is stored and the capstan drive system for isolating the tape on the reels from the segment of tape adapted to be driven by the capstan drive system. Sufficient tape should be available in these loops for acceleration by the capstan drive system in the interval after a command to start the tape and before the reels come up to speed. The purpose of providing short start times is sometimes defeated by the loops themselves, since the weight of the tape in the loops at the high acceleration involved places a load on the capstan drive system high enough to retard the rapid acceleration of the tape by the capstan drive system.

The physical location of loops of tape between the reels and the capstan drive systems sometimes presents problems. Bins or receptacles for receiving the loops can make threading of the tape in the station difficult.

Formation of the loops may be accomplished by maintaining a difference of pressure across the loops, as by means of a vacuum pump, and such vacuum systems have been found desirable. However, when several loops are required, several vacuum pumps have been used which increases initial and operating expenses of the tape station.

It is an object of the present invention to provide improved tape handling apparatus which facilitates rapid starting, stopping, and reversal of a tape.

It is a further object of the present invention to provide an improved vacuum operated system for forming tape loops between the reel and capstan drive systems of a tape station wherein limitations on starting time, such as are imposed by the use of long tape loops, are overcome.

It is a still further object of the present invention to provide improved tape handling apparatus which not only provides tape loops for facilitating the rapid starting, stopping, and reversal of a tape, but which also facilitates threading of the tape in the apparatus.

It is a still further object of the present invention to provide improved apparatus for providing isolating tape loops by means of vacuum which may utilize a single vacuum pump.

It is a still further object of the present invention to provide an improved tape transport wherein variations in the time required to stop, start, and reverse the tape will not vary from one start, stop or reversal to another.

The foregoing objects and advantages of the invention may be obtained in a tape transport apparatus having a capstan drive system for driving a tape in opposite directions across a magnetic head and also having a pair of reels for supplying tape to and taking up tape from the capstan drive system. In accordance with an embodiment of the present invention, a pair of vacuum receptacles may be provided respectively between the capstan drive system and different ones of the reels for forming main tape isolating loops in which the tape is under constant tension regardless of the position or the size of the loops. An auxiliary pair of vacuum receptacles may be provided respectively between the capstan drive system and different ones of the first pair of vacuum receptacles. The auxiliary vacuum receptacles may be open at one end for receiving tape and forming the tape into auxiliary loops in which the tape is under varying tension depending upon the position of the auxiliary loops in their receptacles and the size of the auxiliary loops. There exist predetermined auxiliary loop positions where, regardless of the positions of the main loops, the tension on the tape in the auxiliary loops balances the tension on the tape in the main loops. The tape then moves from the main receptacles to the auxiliary receptacles or vice-versa when the positions of the auxiliary loops vary from their predetermined positions so as to restore the auxiliary loops to those positions. The size of the auxiliary loops depends on their positions in the auxiliary receptacles. Thus, auxiliary loops of substantially the same size are thereby provided to facilitate rapid starting, stopping, and reversal of the tape by means of the capstan drive system.

The cross-sectional area of the auxiliary receptacles in planes transverse to the longitudinal axes of the auxiliary loops formed therein decreases or tapers with distance in a direction away from the open ends of the receptacles. This decrease in cross-sectional area may be provided by means of walls in the auxiliary receptacles which are disposed adjacent the faces of the tape therein and which taper or funnel inwardly toward each other in a direction away from the open ends of the receptacle.

Figure 2:
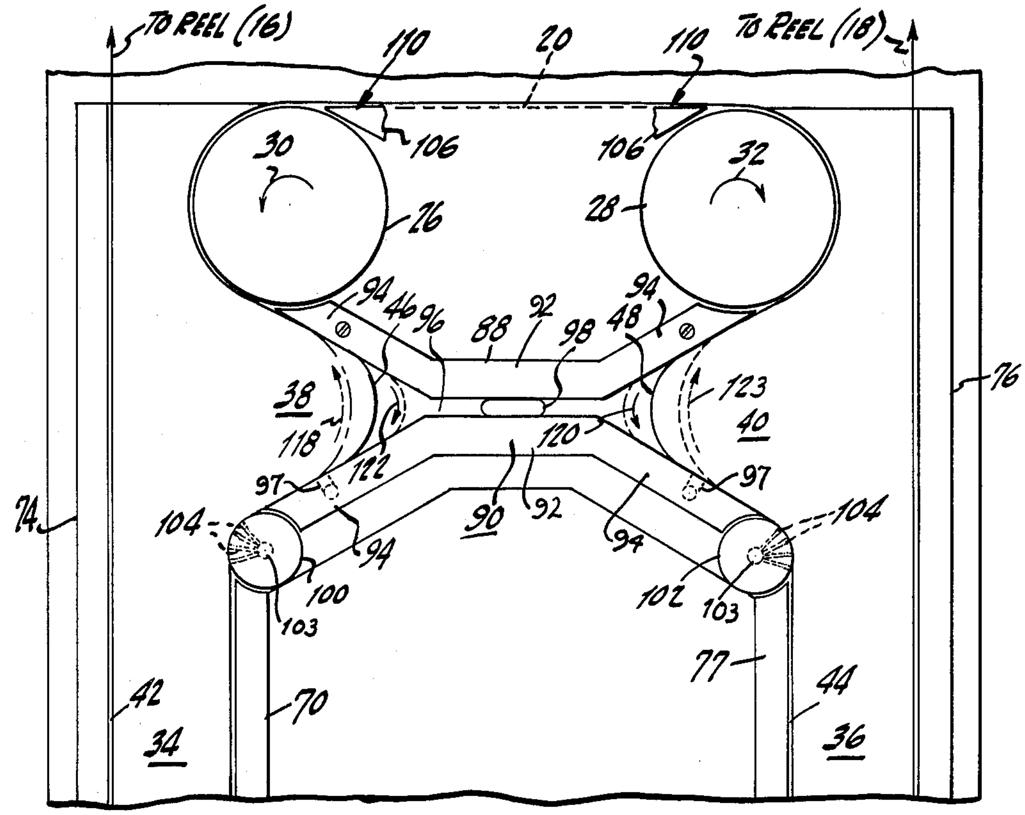

The invention itself, both as to its organization and method of operation, as well as additional objects and advantages thereof, will become more readily apparent from a reading of the following description in connection with the accompanying drawings, in which:

FIG. 1 is a front elevational view, diagrammatically illustrating a tape station embodying the invention; and FIG. 2 is an enlarged, fragmentary, front elevational view showing the auxiliary vacuum receptacles of the apparatus of FIG. 1 in greater detail.

Referring more particularly to FIG. 1, there is shown an upright panel 10 in which spindles 12 and 14 are mounted. These spindles 12 and 14 may extend from turntables (not shown) on which reels 16 and 18 are adapted to be retained. A magnetic tape record 20 is wound on the reels. The reels may be contained in a cartridge or magazine 22 diagrammatically depicted by the dashed line. The spindles 12 and 14 and turntables are coupled to individual drive motor (not shown) which are mounted on the rear or back side of the panel 10. The motors may be reversible so as to drive the reels in oppisite directions either to supply or to take up the tape 20.

A magnetic head 24 is mounted on the panel 10. This head may be of the type used in computer tape stations and has a plurality of head units, each including a gap for scanning a separate record track on the tape 20. The gaps may be disposed in alignment with each other along a line in a direction extending transversely of the tape 20. The tracks are then spaced laterally from each other width-wise across the tape. A pair of capstans 26 and 28 is disposed on opposite sides of the head with their axes parallel to each other. The capstan 26 and 28 may be vacuum capstans which include electromechanically operated valves for communicating a vacuum source, such as a vacuum pump, to apertures at the peripheries of the capstans. The capstans 26 and 28 may be driven continuously but they do not drive the tape unless the valves therein are operated in response to a command in the form of electrical signal levels applied to their respective valves. The capstans rotate at high speed (for example, at a peripheral velocity of 150 inches per second) in opposite directions as indicated by the arrows 30 and 32. Thus, when the valves of the capstan 26 is operated, the tape is brought into engagement with the periphery of the capstan 26 and is rapidly started, in a direction from right to left as viewed in FIG. 1, which is called the forward direction herein. The tape is accelerated practically instantaneously to the peripheral velocity of the capstan. The tape is started and accelerated in the reverse direction when the valve in the other capstan 28 is actuated.

The capstans 26 and 28 are capable of accelerating the tape very much faster than the reels. Accordingly, an arrangement of vacuum receptacles 34, 36, 38, and 40 is provided for forming isolating tape loops 42, 44, 46 and 48, respectively. The receptacles 34 and 36 are main vacuum receptacles in which the relatively larger and longer loops 42 and 44 are provided. The receptacles 38 and 40 are auxiliary receptacles in which the relatively smaller and shorter auxiliary loops 46 and 48 are provided.

Tape loop position sensors (not shown) are provided for sensing the position of the tape in the main receptacles 34 and 36 and for providing outputs indicative of the deviation of the positions of the bights of the loops 42 and 46 in these receptacles from a predetermined position. These signals are applied to servo systems for controlling the direction and speed of rotation of the reels 16 and 18 (FIG. 1). Under the control of the servo system, the reels supply tape to or take up tape from the receptacles 34 and 36 and tend to maintain the loops 42 and 44 in the receptacles at a desired position and, therefore, a desired size. Such position sensors and servo systems are known in the art and are therefore not described in detail herein.

The receptacles 34, 36, 38 and 40 may have a common rear plate 50 which may be mounted on the panel 10 by means of stand-offs (not shown) so that the reels 16 and 18, the capstans 26 and 28, and the head 24 are at the same level beyond the panel 10. Separate rear plates may be used for each receptacle, if desired. The rear plate 50 is somewhat in the form of the letter "H," having vertical legs 52 and 54 and a horizontal connecting arm 56. The legs 52 and 54 have sectors cut away near the upper portions thereof to provide clearance for the capstans 26 and 28. The arm 56 provides a rear plate for the auxiliary receptacles 38 and 40. The receptacles also have a front plate 58 indicated as being of a transparent material, such as glass or plastic. This front plate has leg sections 60 and 62, respectively over the vertical legs 52 and 54 of the rear plate 50, and a center section 64 over the horizontal arm 56 of the rear plate 50.

The main receptacles 34 and 36 respectively have inner side walls 70 and 72 and outer side walls 74 and 76. The receptacles 34 and 36 also have bottom walls 78 and 80. These walls may be strips of metal, such as aluminum, stainless steel, or the like, or of plastic material, having flat, parallel edge faces on which the front and rear plates are seated. The side walls 70 and 74 and the bottom wall 78 form a U-shaped wall configuration for the main receptacle 34, and the side walls 72 and 76 and the bottom wall 80 similarly form a U-shaped wall configuration for the other main receptacle 36. The side walls separate the rear plate 50 and the front plate 58 from each other by a distance slightly greater than the width of the tape 20. Screws 81 hold the front plate 58 sections and the side walls on the rear plate 50. The outer side walls 74 and 76 are longer than the inner side walls and extend to the top edge of the rear plate 50. The openings to the main receptacles 34 and 36 are respectively between the capstans 26 and 28 and the outer side walls 74 and 76. The reels are approximately directly above the openings to the main receptacles.

The main receptacles 34 and 36 have ports 82 and 84 near their bottom walls 78 and 80. These ports may be connected through suitable hoses to a vacuum pump, preferably the same vacuum pump is used to exhaust both main chambers 34 and 36 and provide a constant subatmospheric pressure therein.

Threading of the tape into the main receptacles is easily accomplished. The tape drops into the top of the main receptacles 34 and 36 and is then sucked downwardly into the main receptacles to form the loops 42 and 44 therein. The side faces of the loops 42 and 44 are closely adjacent to the side walls 70, 72, 74 and 76 of the main receptacles 34 and 36 so that the differential in pressure is maintained by the vacuum pump across the bights of the loops 42 and 44.

The auxiliary receptacles 38 and 40 have upper and lower side walls 88 and 90, respectively, which may be strips similar to those which form the side and bottom walls of the main receptacles. These side walls 88 and 90 have central sections 92 and end sections 94 which are inclined with respect to the central sections 92 and which form equal internal angles therewith (for example, angles of 155°). The central sections 92 of the side walls 88 and 90 are disposed horizontally on the rear plate 50 parallel to and spaced from each other, and they form a narrow throat 96 through which air is exhausted from the auxiliary receptacles 38 and 40 into a port 98, which extends through the rear plate 50. The port 98 is in the form of a long narrow opening. A hose connected to a fitting (not shown) on the back of the rear plate 50 may be used to couple the port 98 to the vacuum pump. As mentioned above, the same constant pressure vacuum pump may be used to exhaust the auxiliary receptacles 38 and 40 and the main receptacles 34 and 36. The end sections 94 of the side walls 88 and 90 taper away from each other from the throat 96 to the open ends of the receptacles 38 and 40. The angle included in these tapered side walls of the receptacles 38 and 40 is desirably an acute angle. An angle of 50° has been found suitable. The tapered side walls make the receptacles funnel-like in shape. The longitudinal axes of the auxiliary receptacles 38 and 40 are perpendicular to the longitudinal axes of the main receptacles 34 and 36.

The open ends of the auxiliary receptacles 38 and 40 are disposed along the inner side walls 70 and 72 of the main receptacles 34 and 36, respectively. The tape along the inner sides of the main loops 42 and 44 is sucked into the receptacles 38 and 40. Because of the vacuum established in the auxiliary receptacles, auxiliary loops 46 and 48 are formed automatically while the main loops are formed. Manual threading is not required to form these auxiliary loops. The position of the auxiliary loops with respect to the main loops therefore facilitates the threading of the tape. Orifices 97 (see FIG. 2) in the end sections 94 of the lower side wall 90, through which orifices air may be withdrawn by the vacuum pump, may be provided to aid in initially forming the auxiliary loops. The axes of these orifices 97 may be perpendicular to the tape-adjacent faces of the end sections 94.

Because of the tapered relation of the end sections 94 of the side walls 88 and 90, the cross-sectional area of the auxiliary receptacles 38 and 40 in planes perpendicular to the longitudinal axes of these receptacles decreases from the open ends of the respective receptacles toward the throat 96 thereof. The auxiliary loops 46 and 48 thus vary in size as the bights move along the longitudinal axes of the receptacles 38 and 40. The side faces of the tape are disposed adjacent, and practically touching, the side walls 88 and 90 of the receptacles. Thus, a differential in pressure is established by the vacuum pump across the faces of the tape in the bights of the loops.

Since the bights of the auxiliary loops vary in size, depending upon the position of the loops in the auxiliary receptacles, the area across which the difference in pressure is established varies in accordance with the position of the bights of the auxiliary loops and the sizes of these loops. The tension in the tape established by the differential in pressure, across the auxiliary loop 46 or the auxiliary loop 48, therefore varies in accordance with the positions and sizes of these auxiliary loops. This variation in tension with size causes the loops to tend to be of selected size, as will be explained more fully hereinafter.

The tape in the main and auxiliary receptacles are effectively parts of a servo mechanism which may have a resonant frequency at which the tape in the auxiliary receptacles may vibrate excessively. The resonant frequency of the tape in the auxiliary receptacles is effectively reduced because of the narrow throat 96. The throat 96 provides a sufficient damping effect to reduce any resonant vibration and overshooting of the desired position of the auxiliary loops in the auxiliary receptacles.

The tape is guided between the inner walls 70 and 72 of the main receptacles 34 and 36 and the lower side wall 90 of the auxiliary receptacles 38 and 40 by guides 100 and 102 which may be cylindrical posts. These posts each may have an axial orifice 103 and several radial orifices 104 which communicate with the axial orifice 103. (See FIG. 2.) Compressed air is expelled through these orifices 103 and 104. This compressed air forms a hydrostatic air bearing over which the tape passes.

A tensioned length of the tape 20 is provided across the head 24 and around the capstans 26 and 28 when the tape is drawn into the auxiliary and main receptacles by suction. A trapezoidal member 106 which acts as a guide block is disposed between the capstans 26 and 28 on the opposite side of the tensioned length of tape from the head 24. A support block 108, which is mounted on the panel 10, carries the guide block 106.

The guide block 106 has an upper surface 110 over which the tensioned length of tape passes. This surface 110 may have a recess 112 which is curved concavely complementary to the convex curvature of the pole end of the head 24 which engages the tap 20. The pole end of the head 24 extends into the recess 112 and the tape wraps itself around the pole end of the head 24 sufficiently to provide proper head-to-tape contact.

The guide block 106 has transverse grooves (not shown) in its upper surface 110 from which air may be exhausted and into which the tape may be drawn to form transverse corrugations which render the tape transversely rigid. Edge guides along opposite edges of the tape, including pivotally mounted guides 114 and 116 on the block 106, may be provided to accurately guide the tape where the transverse corrugations are provided. Such accurate guidance reduces lateral meandering and skewing of the tape with respect to the head, reduces time errors among signals written on and read from the tape, and permits a higher information packing density on the tape.

The guide block surface also functions as a brake when the capstans 26 and 28 are not actuated to engage the tape. The tape is brought into frictional engagement with the surface 110 of the guide block 106 because of the suction in the grooves. Frictional forces between the tape and the block surface rapidly stop the tape when the tape is not driven by the capstans.

The operation of the auxiliary vacuum receptacles 38 and 40 is apparent from FIG. 2 wherein the front plate 56 and the portions of the guide block 106 are removed to clarify the illustration. Consider the condition of operation where neither the capstan 26 nor the capstan 28 is actuated. Compressed air may be supplied to the capstans when they are not actuated, which air is exhausted through the capstan peripheries and provides films of air which positively separate the tape 20 from the capstans. The tape is held by suction on the guide block 106 surface 110 when the capstans are not actuated, as explained above. A force on the bight of the loop 42 of the main receptacle 34, due to the differential in atomspheric pressure on the opposite faces of the bight of the loop 42, provides a downward tension in the tape along the sides of the receptacle 34. Since the side walls 70 and 74 of the left main receptacle 34 are parallel to each other, the area of the bight of the loop 42 remains constant regardless of the position of the loop 42 in the main receptacle 34. The sub-atmospheric pressure on the bight of the loop 42 is also constant. Thus, the tension in the tape of the loop 42 remains constant irrespective of the main loop position.

A differential in pressure is established on opposite faces of the tape in the bight of the left auxiliary loop 46 and tends to draw the loop inwardly along the longitudinal axis of the auxiliary receptacle 38. As the loop moves inwardly (toward the throat 96 of the receptacle), the area of tape in the bight portion of the loop 46 decreases because the tapered end sections 94 of the side walls 88 and 90 restrict the size of the bight portion of the loop 46. The difference in pressure on opposite faces of the tape in the bight portion of the loop 46 remains the same. Thus, the force on the bight of the auxiliary tape loop 46 decreases as the loop moves toward the throat 96 and increases in size. Similarly, the force on the bight of the auxiliary loop 46 increases as the loop 42 moves in the opposite direction toward the entrance of the auxiliary receptacle 38. The tension in the tape due to the forces on the auxiliary loop 46 also varies with the position and size of the auxiliary loop. A particular auxiliary loop size and position exist where the tension in that portion of the tape between the main receptacle 34 and the auxiliary receptacle 38 is balanced, i.e., the difference in tape tension, due to the vacuum in the main and auxiliary receptacles, is zero. This balanced loop position, referred to herein as the predetermined loop size or position, is indicated by the solid lines in the auxiliary receptacles in FIG. 2.

The tape moves from the main loop 42 into the auxiliary loop 46 when the size of the auxiliary loop decreases from the predetermined size and moves from the auxiliary loop 46 into the main loop 42 when the size of the auxiliary loop increases from predetermined size.

The same vacuum pump may be used for the auxiliary loop and for the main loop since the static pressure behind the auxiliary and main tape loops is maintained constant. The difference in the tension in the tape in the auxiliary and main loops arises because of the shape of the auxiliary receptacles 38 and 40, rather than by reason of variations in vacuum pump pressure.

Now consider the operation of the apparatus when a reverse drive command occurs. The capstan 28 is actuated and the tape is sucked into engagement with the peripheral surface of the capstan 28 which has a velocity of 150 inches per second. The tape is suddenly started from rest and very rapidly accelerated in the reverse direction. The acceleration is desirably so rapid that a tape runs at peripheral capstan velocity or 150 inches per second within two milliseconds after the reverse command to actuate the capstan 28. Tape is first pulled by the capstan 28 from the left auxiliary receptacle 38 and supplied to the right auxiliary receptacle 40. The length of tape in the auxiliary receptacle 38 is very much smaller than the length of the tape loop in the main receptacle 34. If the tape were drawn directly from the main receptacle, a load proportional to the mass of the tape in the main loop multiplied by the rate of acceleration would be effective to oppose the tape acceleration. This load would reduce the starting time or the time required for the tape to accelerate to the running speed of 150 inches per second. However, the much smaller mass of tape in the auxiliary loop 46 is initially utilized so that the load on the capstan during the starting time is considerably reduced.

The size of the loop 46 in the auxiliary receptacle 38 becomes smaller during the starting time. The bight of the loop 46 moves, for example, from the position indicated by the solid line in the receptacle 38 to the left to the position indicated by the line made up of long and short dashes. The direction of movement of the tape which accompanies such a shortening of the tape loop is indicated by the arrow 118 made up of long and short dashes. The result of shortening of the loop 46 is an increase in the tension on the tape due to the vacuum in the receptacle 38 which tends to pull tape into that receptacle. The tape then moves from the left main receptacle 34 into the left auxiliary receptacle 38 and the loop 46 tends to be restored to the position shown by the solid line in the receptacle 38. When the tape is running at capstan peripheral speed, the solid line position of the bight of the loop is only approximately restored. The tape is displaced slightly on one side or the other of the solid line position, depending on the direction of tape travel.

When the tape is withdrawn from the left auxiliary receptacle 38, upon starting in the reverse direction, it is simultaneously delivered to the right auxiliary receptacle 40. The auxiliary loop 48 then assumes the inward position near the throat 96 of the receptacle 40 shown by the line made up of long and short dashes. The arrow 120 indicates the direction of movement of the tape in the auxiliary receptacle 40 when the tape motion is started in the reverse direction. The area of tape in the loop 48 which is exposed to a difference in pressure is reduced during the reverse starting time, and the tension on the tape in the right main receptacle 36 exceeds the tension on the tape in the right auxiliary receptacle 40. The tape then moves out of the auxiliary receptacle 40 and into the main receptacle 36.

The tape loops 46 and 48 in the auxiliary receptacles 38 and 40 assume positions shown by the dashed lines when the tape is started in the forward direction upon actuation of the capstan 26. The arrows 122 and 123 respectively indicate the direction of movement of the tape in the receptacles 38 and 40 when the tape is moving in the forward direction. The operation of the auxiliary receptacles is reversed in maintaining the tape loops in the auxiliary receptacles of balanced size, but is otherwise the same for tape movement in the forward direction and in the reverse direction.

From the foregoing description, it will be apparent that there has been provided improved tape handling apparatus especially suitable for use in tape transports of the type in which tape is rapidly started, stopped and reversed. Since such tape transports are used in computer tape stations, the invention is especially advantageous in providing an improved computer tape station. The invention may also be generally useful in tape handling, especially where a tape must be started, stopped and reversed without imposing excessive tensioning forces on the tape. Although a single embodiment of the invention has been described above for purposes of illustration, variations and modifications within the scope of the invention will, undoubtedly, become apparent to those skilled in the art. Accordingly, the foregoing description should be taken merely as illustrative and not in a limiting sense.

What is claimed is:

1. Tape handling apparatus comprising
(a) capstan means for driving a tape,
(b) means on opposite sides of said capstan means for supplying tape to and taking tape up from said capstan means,
(c) first and second vacuum receptacles respectively disposed on opposite sides of said capstan means for receiving first and second tape loops between said capstan means and said supply and take-up means, the bight portions of said tape of said first and second loops having cross-sectional areas which areas constant for all positions of said loops within said first and second vacuum receptacles,
(d) third and fourth vacuum receptacles disposed respectively between said first receptacle and said capstan means and said second receptacle and said capstan means, said third and fourth receptacles including front and rear walls and a pair of side walls, said side walls tapering inwardly from the entrance of each of said third and fourth receptacles to define funnel-like portions for receiving third and fourth tape loops, said side walls having portions paralleling each other to define a throat portion, the bight portions of said tape of said third and fourth loops having cross-sectional areas which vary directly with the position of said third and fourth loops within said third and fourth vacuum receptacles, and
(e) means for exhausting air from both said third and fourth receptacles through said throat portion.

2. In apparatus for writing information on and reading information from a magnetic tape and including a magnetic head, a pair of vacuum capstans having their axes parallel to each other and respectively disposed on opposite sides of said head, and a pair of reels for supplying and taking up said tape respectively disposed on opposite sides of said head, the improvement comprising
(a) first and second open-ended vacuum receptacles respectively disposed between different ones of said capstans and different ones of said reels, said receptacles having front walls, rear walls and side walls, first and second tape loops being formed in said first and second vacuum receptacles, respectively, the cross-sectional areas of the bight portions of said first and second loops being constant for all positions of said first and second loops within said first and second vacuum receptacles,
(b) a pair of auxiliary, open-ended vacuum receptacles respectively disposed between said first receptacle and one of said capstans and said second receptacle and the other of said capstans, said auxiliary receptacles having front and rear walls and a pair of side walls, said side walls tapering inwardly toward each other from the open ends of said auxiliary receptacles and then paralleling each other to define a throat portion where said side walls are parallel to each other, said throat portion having a port therein for exhausting air from both said auxiliary receptacles for forming a pair of auxiliary tape loops within said pair of auxiliary vaccum receptacles, the cross-sectional areas of the bight portions of said pair of auxiliary loops varying directly with the positions of said pair of auxiliary loops within said pair of auxiliary vacuum receptacles, and
(c) air bearing guides between adjacent side walls of said first receptacle and said third receptacle and between adjacent side walls of said fourth receptacle and said second receptacle.

3. Tape handling apparatus comprising
(a) tape drive means,
(b) means for supplying tape to said tape drive means and taking said tape up from said tape drive means,
(c) first means for providing a first loop of tape between said supply means and said drive means, said first means including a first vacuum receptacle in which said first tape loop is disposed, the bight portion of said tape of said first loop having a cross-sectional area which is constant for all positions of said first loop within said first receptacle.

(d) second means for providing a second loop of tape between said first tape loop and said drive means, said second means including a second vacuum receptacle having a pair of walls which define a throat portion and which taper outwardly away from each other from said throat portion, said second means also including means for exhausting air from said second receptacle by way of said throat portion, said second vacuum receptacle being of lower capacity than said first vacuum receptacle, the bight portion of said tape of said second tape loop having a cross-sectional area which varies directly with the position of said second tape loop within said second vacuum receptacle.

4. The invention as claimed in claim 3 wherein (e) the longitudinal axis of said first vacuum receptacle is perpendicular to the longitudinal axis of said second vacuum receptacle.

References Cited by the Examiner

UNITED STATES PATENTS

| | | | |
|---|---|---|---|
| 2,921,753 | 1/1960 | Lahti et al. | 242—55.12 |
| 3,112,473 | 11/1963 | Wicklund et al. | |
| 3,148,816 | 9/1964 | Martin et al. | 242—55.12 X |
| 3,185,365 | 5/1965 | Rayfield et al. | 242—55.12 X |

MERVIN STEIN, *Primary Examiner.*

L. D. CHRISTIAN, *Assistant Examiner.*